(12) United States Patent
Semba et al.

(10) Patent No.: US 7,457,076 B2
(45) Date of Patent: Nov. 25, 2008

(54) HEAD SEEK CONTROL METHOD SUPPRESSING VIBRATIONS AND ROTATARY RECORDER/REPRODUCER

(75) Inventors: Tetsuo Semba, San Jose, CA (US); Hiroshi Uchida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 140 days.

(21) Appl. No.: 11/335,849

(22) Filed: Jan. 18, 2006

(65) Prior Publication Data

US 2006/0158773 A1 Jul. 20, 2006

(30) Foreign Application Priority Data

Jan. 18, 2005 (JP) ............................. 2005-010540

(51) Int. Cl.
*G11B 5/596* (2006.01)

(52) U.S. Cl. .................................................. 360/78.06

(58) Field of Classification Search ............. 360/78.06, 360/78.07, 78.04, 77.05; 318/561, 568.18; 369/30.17

See application file for complete search history.

(56) References Cited

U.S. PATENT DOCUMENTS

| | | | | | |
|---|---|---|---|---|---|
| 4,200,827 | A | * | 4/1980 | Oswald | 318/561 |
| 4,535,372 | A | * | 8/1985 | Yeakley | 360/77.05 |
| 4,899,234 | A | * | 2/1990 | Genheimer | 360/78.06 |
| 5,151,639 | A | * | 9/1992 | Hasegawa et al. | 318/568.18 |
| 5,343,131 | A | * | 8/1994 | Baumann | 318/561 |
| 5,696,647 | A | * | 12/1997 | Phan et al. | 360/78.07 |
| 5,726,825 | A | * | 3/1998 | Phan et al. | 360/78.07 |
| 5,751,513 | A | * | 5/1998 | Phan et al. | 360/78.07 |
| 5,760,991 | A | * | 6/1998 | Semba | 360/78.06 |
| 5,760,992 | A | * | 6/1998 | Phan et al. | 360/78.07 |
| 6,115,205 | A | * | 9/2000 | Waugh et al. | 360/78.06 |
| 6,327,229 | B1 | * | 12/2001 | Kawabe | 369/30.17 |
| 6,624,964 | B1 | * | 9/2003 | Pirzadeh | 360/78.07 |
| 6,738,220 | B1 | * | 5/2004 | Codilian | 360/78.04 |
| 6,791,785 | B1 | * | 9/2004 | Messenger et al. | 360/78.04 |
| 6,831,809 | B2 | | 12/2004 | Kagami et al. | |
| 6,937,431 | B2 | * | 8/2005 | Galloway | 360/78.06 |
| 6,995,944 | B1 | * | 2/2006 | Takaishi et al. | 360/78.06 |
| 7,136,256 | B2 | * | 11/2006 | Takaishi et al. | 360/78.04 |
| 7,203,028 | B2 | * | 4/2007 | Chung et al. | 360/78.06 |

OTHER PUBLICATIONS

Mizoshita et al., "Vibration Minimized Access Control for Disk Drives," IEEE Transaction on Magnetics, vol. 32, No. 3 (May 1996), pp. 1793-1798.

* cited by examiner

*Primary Examiner*—Fred Tzeng
(74) *Attorney, Agent, or Firm*—Townsend and Townsend and crew LLP; Patrick Duncan

(57) ABSTRACT

In seek control for a head of a rotary recorder/reproducer, the seek time is reduced with noise reduced while utilizing a driving force of an actuator effectively. In one embodiment, when a microprocessor generates a control signal for a drive current given to an actuator for head seek, a signal generator generates a prespecified acceleration allowing for the allowable maximum acceleration when the actuator is accelerated, a prespecified deceleration signal allowing for the allowable maximum deceleration when the actuator is decelerated, and a zero level signal when the actuator is settled. Switching from deceleration to settling is performed at a point of time computed by the microprocessor as a time point when settling is to be started so that the head may reach a target position within the shortest period of time.

16 Claims, 11 Drawing Sheets

HEAD SEEK CONTROL METHOD SUPPRESSING VIBRATIONS AND ROTATARY RECORDER/REPRODUCER

CROSS-REFERENCES TO RELATED APPLICATIONS

This application claims priority from Japanese Patent Application No. JP2005-010540, filed Jan. 18, 2005, the entire disclosure of which is incorporated herein by reference.

BACKGROUND OF THE INVENTION

The present invention relates to a head seek control method suppressing vibrations and to a rotary recorder/reproducer.

As a method of controlling a position of a head in a rotary recorder/reproducer such as a hard disk drive (HDD), there have been known the one-degree-of-freedom control in which only feedback control is employed, and the two-degree-of-freedom control in which, in addition to a feedback signal, also a feed-forward signal is used for control. In the two-degree-of-freedom control, the target value response performance (seek performance) is realized mainly with the feed-forward signal, and the external disturbance response performance (following performance) is realized with the feed-back signal. Because of this feature, the two performances can be optimized independently, which enables improvement in the control performance or in the response performance. Therefore, now the two-degree-of-freedom control is more and more widely employed for controlling a position of an HDD head, for which shortening of the head seek time is now strongly required.

In relation to the seek performance relating to high-speed movement of a head to a target track in an HDD, when high-speed seek is performed, vibrations occur in an actuator. In this case, attenuation of the excited vibrations is required to position a head on the target track, the seek time is delayed by the time required for waiting attenuation of the vibration. Further the excited vibrations are propagated to a cover, and sometimes acoustic noise is disadvantageously generated due to the vibrations of the cover.

To overcome the problems, an approach has been disclosed to smoothing a current waveform by feed forwarding with a polynomial function of high degree for time (refer to non-patent document 1: IEEE Transaction on Magnetics, Vol. 32, No. 3, May, 1996, pp 1793-1798). With this method, it is possible to suppress high frequency vibrations mainly caused by vibrations of the actuator, and also to reduce the acoustic noise caused by the vibrations.

Further an approach has been disclosed to smoothing a feed-forward current waveform with a short wavelength with an FIR filter in a short seek distance which is one hundredth of the maximum seek distance or below in patent document 1 (Japanese Patent Laid-open No. 2002-258902). In this document, a seek operation for 64 tracks is disclosed as an example.

BRIEF SUMMARY OF THE INVENTION

With the method described in non-patent document 1, all signals with high frequencies in a prespecified high range are suppressed regardless of a frequency in a vibration mode of the actuator, so that the seek time cannot be shortened by effectively utilizing a driving force of the actuator to improve the seek speed.

With the method described in patent document 1, in the driving control for moving a head at a high speed to a target track, namely in the seek control in a rotary recorder/reproducer, it has not been possible to utilize the driving force of the actuator for shortening the seek time or for reducing acoustic noise.

The present invention has been made to solve the problems as described above, and enables effective utilization of a driving force generated by an actuator in high-speed seek control for a head of a rotary recorder/reproducer to improve the seek speed and also simultaneous, efficient realization of both shortening of the seek time and suppressing generation of acoustic noises by suppressing vibrations.

The present invention, when generating a control signal for a driving current fed to an actuator for head seek, a microprocessor in a rotary recorder/reproducer adds outputs related to acceleration of a feedback controller to signals generated during acceleration, deceleration and settling and provides the signals each with additional factors added thereto to the actuator. Switching from an acceleration signal to a deceleration signal is performed at a point of time when the deceleration estimated from the acceleration, velocity and position estimated at a position where the head during acceleration is monitored is the allowable maximum deceleration. In addition, switching from a deceleration signal to a settling signal is performed at a point of time when settling is to be started to reach the target position computed from the estimated acceleration, speed, and position in the shortest period of time.

In specific embodiments, the generated signal has a waveform smoothed with a finite impulse response (FIR) filter. The acceleration is the allowable maximum acceleration for the head, and the deceleration is the allowable maximum deceleration for the head. The acceleration signal is a signal kept at the same level as the maximum level corresponding to the maximum voltage for a current driver for inputting a drive current to the actuator.

In some embodiments, the microprocessor inputs an output from the FIR filter into an actuator model, computes a difference between an output from the actuator model and a position signal read out by a position signal read section via the head, inputs the difference into the feedback controller, and zeros an input to the filter at a point of time when settling is started to execute computing for the feedback controller. A signal generated by a signal generator in deceleration and in settling has such a waveform that the signal changes from the acceleration signal to the deceleration signal in monotonous change mode and then changes from the deceleration signal to the settling signal in monotonous change mode. The FIR filter for smoothing a waveform of a signal generated during deceleration is the same as that for smoothing a waveform of a signal generated in settling. The summed output is inputted into a digital/analog converter, and an output from the digital/analog converter is inputted into the current driver.

With the present invention, in high-speed seek by a head in a rotary recorder/reproducer such as an HDD, it is possible to shorten the seek time by suppressing vibrations of the head and also to reduce acoustic noise generated and propagating through a cover by suppressing vibrations of the head during a seek operation.

DETAILED DESCRIPTION OF THE INVENTION

The following description is for explaining general principles of the present invention, and is not intended to limit the invention.

An embodiment of the present invention is described below with reference to a case where the present invention is applied to a magnetic disk device as an example of a rotary recorder/reproducer.

Figure 4:
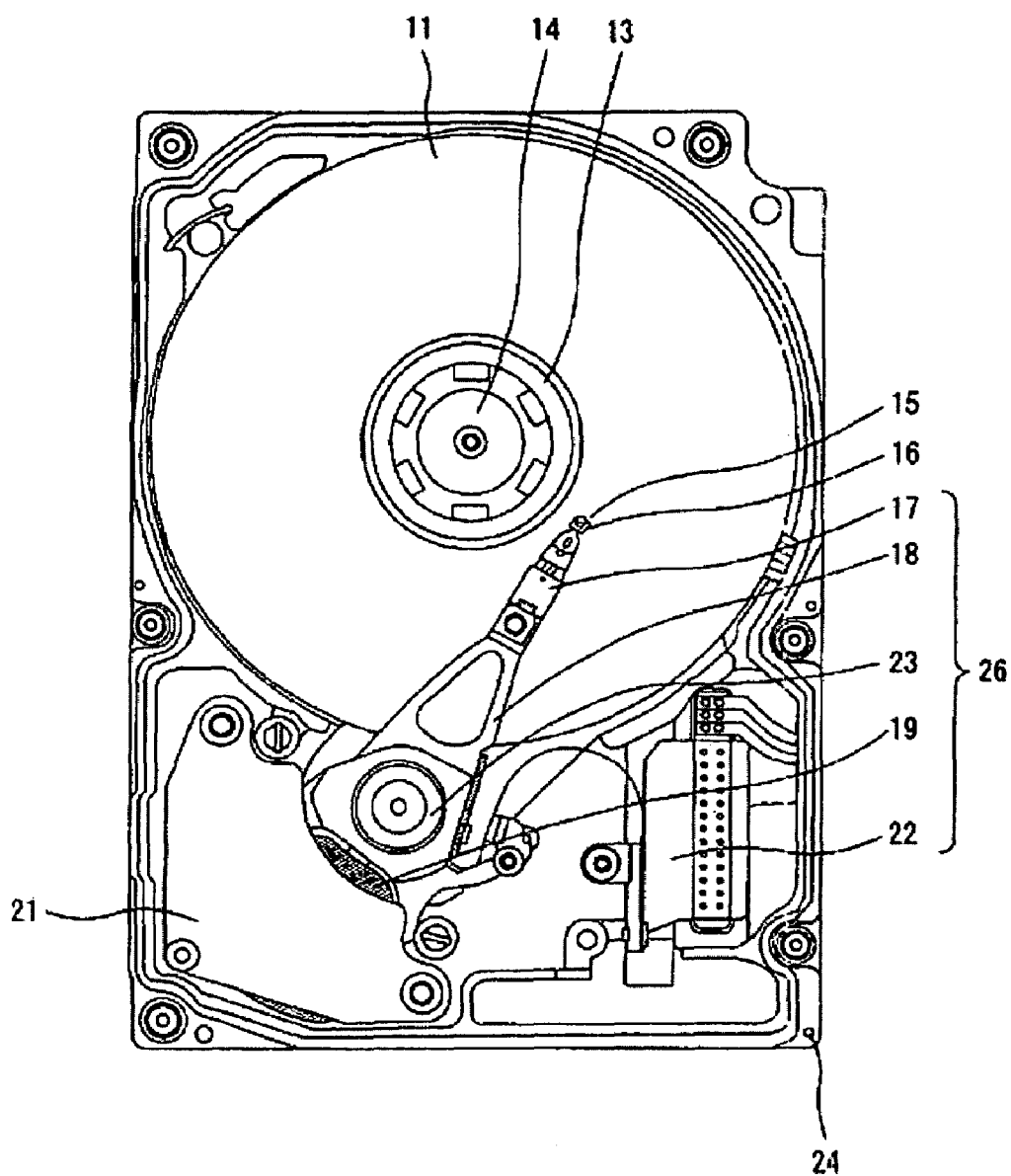
FIG. 4 is a perspective view showing an example of internal configuration of a hard disk drive.
Figure 6:
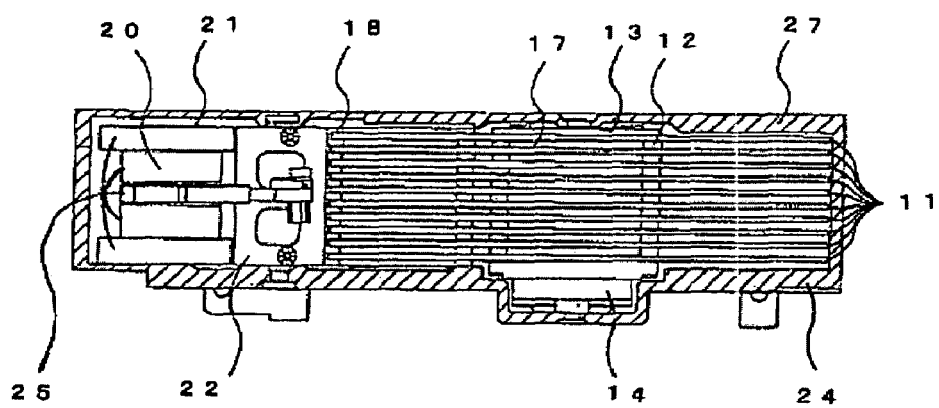
FIG. 6 is a cross-sectional view showing an example of another internal configuration of the hard disk drive.

FIGS. 4 and 6 illustrate the internal configuration of a magnetic disk drive (HDD) according to the embodiment. In the figures, the HDD according to the present embodiment includes a magnetic disk 11 as a recording medium for recording therein position control information and data, a disk spacer 12 and a disk clamp 13 each for fixing the magnetic disk 11, and a spindle motor 14 for rotating the magnetic disk 11. In addition, the HDD includes a magnetic head 15 for reading/writing positional control information and data from and to the magnetic disk 11, a head assembly 17 including a slider 16 with this magnetic head 15 carried thereon, a carriage 18 with the head assembly 17 clamped thereto, a coil 19, a magnetic circuit 21 including a magnet 20, a flexible printed-circuit board (FPC) 22, a bearing unit 23, and a base 24. Further, the HDD has a control unit 39 for controlling the device as a whole and a mechanism control function as well as a write/read circuit function for transacting information with the control unit 39 (see FIG. 7).

The coil 19 is attached to the carriage 18, and the magnetic circuit 21 including the coil 19 and magnet 20 forms a voice coil motor (VCM) 25. The VCM 25 drives the head assembly 17. The carriage 18 moves the head assembly 17 with the bearing unit 23 according to the position control information on the magnetic disk 11 and a current supplied via the FPC 22 from an IC board (not shown) to position the magnetic head 15 at a specified position on the magnetic disk 11. The head assembly 17, carriage 18, coil 19, a portion of the FPC, and bearing unit 23 form an actuator 26 together with the VCM 25. The components are accommodated in and fixed to a housing comprising the base 24 and a cover 27.

Figure 7:
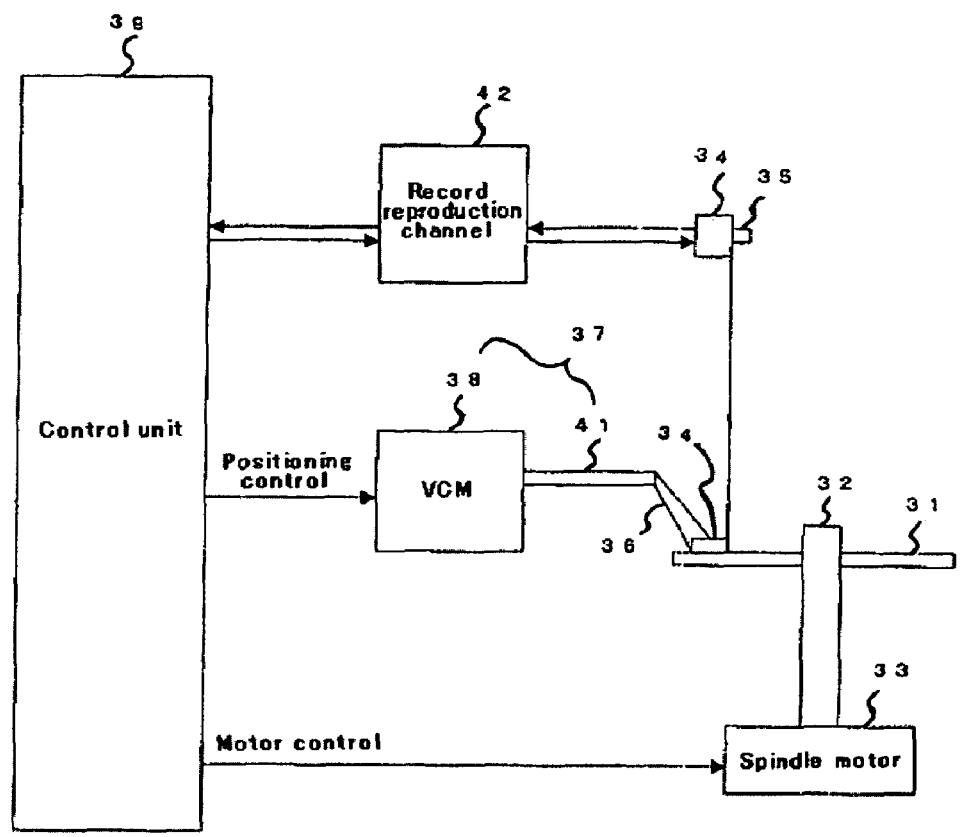
FIG. 7 is a diagram showing an example of system blocks in the entire hard disk drive.

FIG. 7 is a system block diagram showing a simplified configuration of the entire HDD according to an embodiment of the present invention.

At least one sheet of magnetic disk 31, which is a sheet of rotatable recording disk, is supported by a disk spindle 32 and is rotated by a spindle motor 33. A head assembly 36 including a slider 34 with a magnetic head 35 carried thereon is attached to an actuator 37 via a carriage 41 included in the actuator 37. The actuator 37 includes a VCM 38 and an orientation and a speed of the VCM 38 are controlled according to a motor current sent from a control unit 39. In this control, operations of the head 35 in seeking and settling are controlled according to the head seek control method according to the present invention as well as to control signals generated by the control unit. In FIG. 7, two units of the sliders 34 are shown, but these are the same units, and FIG. 7 schematically shows that the head 35 mounted in this slider 34 is also connected to a record/reproduce channel 42.

Figure 8:
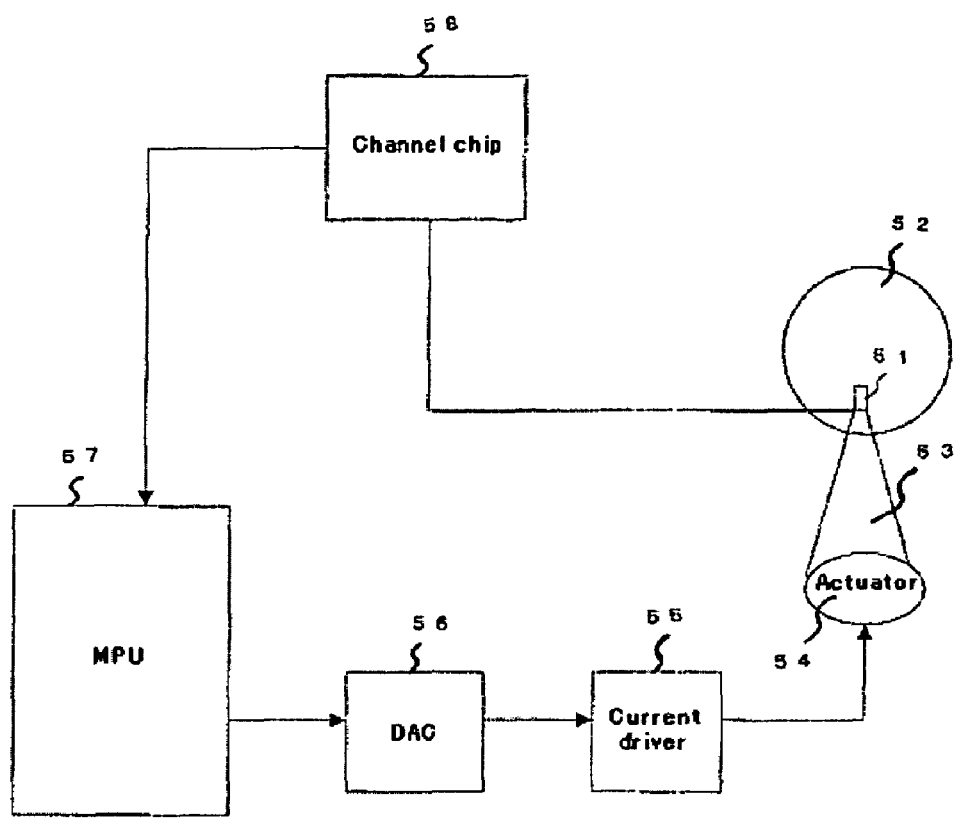
FIG. 8 is a diagram showing an example of a head seek control system in the hard disk drive.

FIG. 8 illustrates a head seek control system of the HDD according to an embodiment of the present invention. A digital signal from a microprocessor (MPU) 57 generating a control signal for a drive current given to the actuator 5 for head seek in a head seek control unit is subjected to DA conversion by a digital/analog converter (DAC) 56 to become an analog signal. The current driver (CD) 55 turns an actuator 54 including a VCM according to this analog signal. The turning of the actuator 54 pivotally moves an arm 53 including a head assembly and a carriage, thereby moving a magnetic head 51 mounted on a slider provided at a tip portion of the arm 53 over a magnetic disk 52. A channel tip 58 detects a position of the magnetic head 51 on the magnetic disk from a position signal read by the magnetic head 51, and outputs the position to the MPU 57. The MPU 57 generates a control signal for a drive current based on the position information from the channel tip 58.

Figure 1:
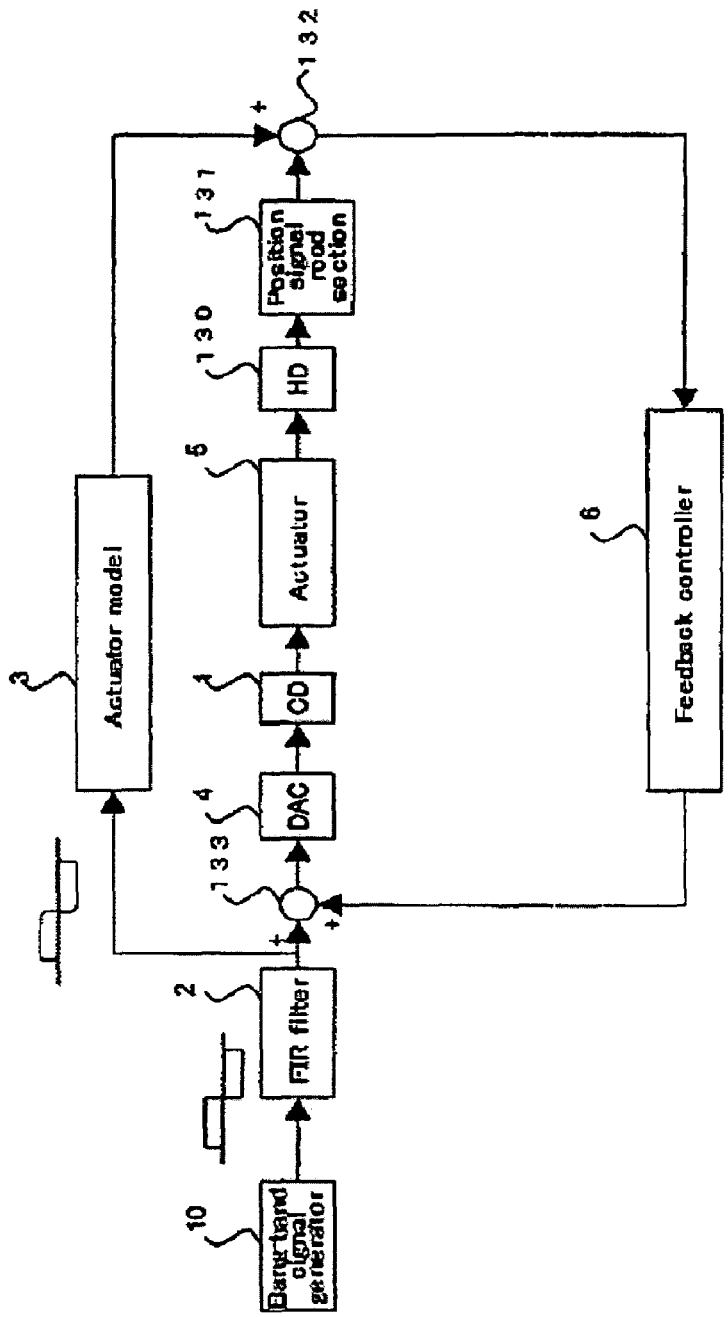
FIG. 1 is a diagram showing an example of a seek control system.

FIG. 1 shows an example of the control system in a case where there is no current saturation in the current driver, namely where a maximum current corresponding to the maximum voltage for the current driver does not flow.

This control system comprises an actuator model 3, an FIR filter 2, a feedback controller 6, a digital/analog converter (DAC) 4, a current driver (CD) 1, actuator 5, a head (HD) 30, and a Bang-bang signal generator 10. The current driver 1 receives as an input a signal obtained by subjecting an output from an adder 133 to digital-to-analog conversion by the DAC 4, and converts, amplifies, and outputs the signal as an actuator drive current to the actuator 5. The Bang-bang signal generator 10 generates a signal defining the maximum acceleration when the current saturation does not occur. As described above, in this control system, the maximum current corresponding to the maximum voltage to the current driver 1 is not allowable. In other words, it is not allowable that the acceleration signal inputted to the actuator 5 is the same constant level as the maximum level corresponding to the maximum voltage to the current driver 1.

The adder 133 adds an output from the FIR filter 2 to an output from feedback controller 6 which is a controller for the ordinary track follow loop (a loop returning through the feedback controller 6). Further the output from the FIR filter 2 is inputted to the actuator model 3, and a subtractor 132 computes a difference between an output from the actuator model 3 and a position signal outputted from the head 30, and inputs the difference into the feedback controller 6.

In the following description, it is assumed that a target for control is a perfect double-integrator plant for a seek operation of a head including an actuator in a rotary recorder/ reproducer. In this case, the state in time t from a given initial value, namely a velocity V and a position P of the head is as expressed by the following equations respectively:

$$v(t) = v_0 + C_0(t - t_0) \qquad \text{[Equation 1]}$$

$$p(t) = p_0 + v_0(t - t_0) + \frac{C_0}{2}(t - t_0)^2 \qquad \text{[Equation 2]}$$

wherein $C_o$, $P_0$, $v_0$, and $t_0$ indicates a given initial constants.

In this case, acceleration is started from t=0 (namely, when a jerk value indicating a change rate in acceleration is a positive value), and the jerk becomes zero when t=Tw. Then deceleration is started at t=T (namely, when a value of jerk is a negative value), and jerk becomes zero at t=Tw+T. Then settling is started at t=2T, and then the head arrives at a target, namely at a target position at t=2Tw+T. At this point of time, a waveform fw (t) of the jerk is equal to zero (fw(t)=0) because T>t>Tw and 2T>t>(Tw+T).

Figure 5:
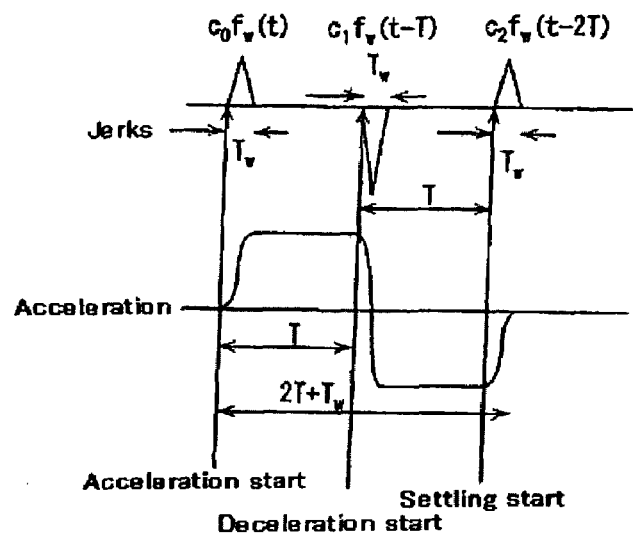
FIG. 5 illustrates an example of jerks when acceleration, deceleration, and settling are started as well as an example of acceleration.

As every state reflects a total of a signal for acceleration, a signal for deceleration, and a signal for settling, the jerk is expressed, as shown in FIG. 5, by the following equation:

$$f(t) = c_0 f_w(t) + c_1 f_w(t-T) + c_2 f_w(t-2T) \qquad \text{[Equation 3]}$$

wherein $c_0$, $c_1$, and $c_2$ indicate coefficients for jerk waveforms during acceleration, deceleration, and settling, respectively.

To generalize assuming that an area of the jerk waveform fw is 1, the following equation is given:

$$\int_0^{Tw} f_w(t) dt = 1 \qquad \text{[Equation 4]}$$

Then the acceleration is given by the following equation:

$$a(t) = c_0 \int f_w(t) dt + c_1 \int f_w(t-T) dt + c_2 \int f_w(t-2T) dt \qquad \text{[Equation 5]}$$

During acceleration, Tw<t≦T, the second and third terms are zero, and integration of the first term gives 1, so that the acceleration a(t) is equal to $c_0$.

The velocity is given by the following equation:

$$v(t) = c_0 \int\int f_w(t) dt dt + c_1 \int\int f_w(t-T) dt dt + c_2 \int\int f_w(t-2T) dt \qquad \text{[Equation 6]}$$

Excluding the case where 0<t≦Tw, fw(t) is equal to 0 (fw(t)=0), and therefore it may be assumed that the double integral Vs of the jerk waveform from t=0 to t=Tw is expressed by the following equation:

$$v_s = \int_0^{Tw}\int_0^{\tau} f_w(t) dt d\tau \qquad \text{[Equation 7]}$$

wherein τ is an integration parameter.

When t≧Tw+2T, the following equation is obtained:

$$v(t) = c_0 v_s + c_0(t-T_w) + c_1 v_s + c_1(t-T_w-T) + c_2 v + c_2(t-T_w-2T) \qquad \text{[Equation 8]}$$

To rewrite this equation substituting a value when the jerk becomes zero as an initial value for expressing the velocity in other form, because the final velocity $v_f$ is zero at t=Tw+2T, the velocity is given by the following equation:

[Equation 9]

$$v_f = v(2T+T_w) = c_0 v_s + c_0(2T) + c_1 v_s + c_1 T + c_2 v_s = (c_0 + c_1 + c_2) v_s + (2c_0 + c_1)T = 0 \qquad \text{(Expression 1)}$$

A position may be obtained through the similar operations, and when it is assumed that the triple integration $p_s$ of the jerk waveform from t=0 to t=Tw is given by the following equation:

$$p_s = \int_0^{T_w} \int\int f_w(t) dt dt\, dt \qquad \text{[Equation 10]}$$

Then a position p(t) when t≧2T+Tw is given by the following equation:

$$p(t) = c_0 p_s + c_0 v_s(t - T_w) + \frac{c_0}{2}(t - T_w)^2 + \\ c_1 p_s + c_1 v_s(t - T_w - T) + \frac{c_1}{2}(t - T_w - T)^2 + \\ c_2 p_s + c_2 v_s(t - T_w - 2T) + \frac{c_2}{2}(t - T_w - 2T)^2 \qquad \text{[Equation 11]}$$

Therefore the target position $p_f$ is given by the following equation:

[Equation 12]

(Expression 2)

$$p_f = c_0 p_s + c_0 v_s(2T) + \frac{c_0}{2}(2T)^2 + c_1 p + c_1 v_s T + \frac{c_1}{2}T^2 + c_2 p_s \\ = (c_0 + c_1 + c_2)p_s + (2c_0 + c_1)T + \left(2c_0 + \frac{c_1}{2}\right)T^2$$

From expressions 1 and 2, when $c_2 = c_0$, $c_1 = -2c_0$, the final velocity is zero, so that the target position is expressed by the following equation:

$$p_f c_0 T^2 \qquad \text{[Equation 13]}$$

Figure 11:
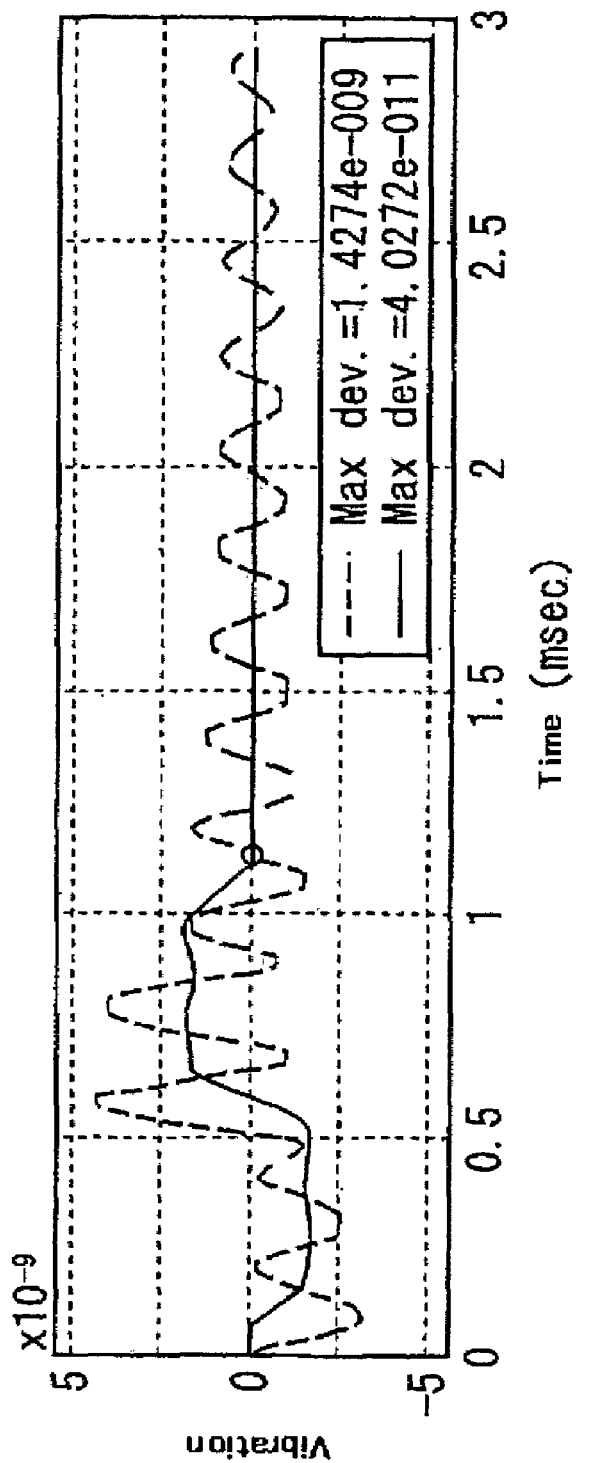
FIG. 11 illustrates an example of a comparison of residual vibrations of head between a case where an input signal for head drive control is passed through the FIR filter and a case where the input signal is not passed through the FIR filter.

FIG. 11 is a view showing that the FIR filter 2 is effective in suppressing residual vibrations. The broken line denotes residual vibrations of a head when the FIR filter 2 is removed, while the solid line denotes residual vibrations of the head when the FIR filter 2 is used. It is clear that the residual vibrations attenuate more quickly when the FIR 2 filter is used.

In the control described above, when a current is saturated in a current driver, namely when the maximum current corresponding to the maximum voltage for the current driver flows, performance of the actuator loses coincidence with the model. Therefore in seeking over a long distance, it is necessary to prevent the current from being saturated in the current driver so that the mismatch described above will not occur in the current driver. To achieve this objective, it is required to make the current smaller so that the maximum current corresponding to the maximum voltage to the current driver will not flow. Even when the current saturation is allowed, namely when the maximum current corresponding to the maximum voltage to the current driver is allowed to flow, the seek time becomes longer as compared to the case where performance of the actuator matches the model. It is to be noted that the long distance in seeking as used herein indicates one tenth or more of the longest distance in seeking.

In the present invention, when certain conditions are satisfied, when the deceleration estimated from the acceleration, velocity, and position estimated from a position of a head monitored during acceleration, deceleration is started. A trajectory is generated which allows the head to move while satisfying the conditions for the waveform to suppress the residual vibrations described above during seek. Current saturation in the current driver is allowed until deceleration is started. In other words, the maximum current corresponding to the maximum voltage to the current driver is allowed to flow until deceleration is started. In this case, a signal allowed on the assumption that an input to the actuator is a signal at the same constant level as the maximum level corresponding to the maximum voltage to the current driver is used as a pre-specified acceleration signal at a level for generation of the maximum acceleration allowable in acceleration.

An embodiment of the present invention will be described below in which a portion of the equations 1 to 13 are changed as described below so that the equations are applicable even when current saturation occurs in the current driver.

In Expression 1 above, the same function fw(t) is always used when acceleration is started, when deceleration is started, and when settling is started. However, if the state when deceleration is started is understood, use of the same function is not always required, and current saturation in a current driver is allowed: in other words, the maximum current corresponding to the maximum voltage to the current driver is allowed to flow.

For instance, it is assumed that $a_0$, $v_0$, $p_0$ indicate acceleration, velocity, and a position upon start of deceleration respectively, and also that settling is started in time T after the start of deceleration. The velocity $v_f$ at the final time T+Tw is obtained from the following (Expression 3) in the same procedure as that for introducing (Expression 1). Specifically, assuming that the current time during acceleration is initial time 0 and based on $a_0$, $v_0$, $p_0$ indicating acceleration, velocity, and a position upon start of deceleration respectively, the respective velocities at time after T+Tw are calculated for a case where the jerk indicated by $c_1$ is applied from the point of time, and also for a case where the jerk indicated by $c_2$ is applied in the time T from the point of time. Then the calculated velocities are synthesized. Also the (Expression 4) may be obtained in the same way. Once deceleration is started, calculations for $a_0$, $v_0$, $p_0$ are not required.

[Equation 14]

(Expression 3)
$$v_f = a_0(T + T_w) + v_0 + c_1 T + c_1 v_s + c_2 v_s = 0$$

(Expression 4)
$$p_f = p_0 + v_0(T + T_w) + \frac{a_0}{2}(T + T_w)^2 + c_1 p_s + c_1 v_s T + \frac{c_1}{2}T^2 + c_2 p_s$$

As the acceleration at the final time is required to be zero, the following equation is obtained:

$$a_0 + c_1 + c_2 = 0 \quad \text{[Equation 15]}$$

The target position is given, based on the (Expression 2) and (Equation 13) for a case where current saturation does not occur in the current driver, namely where the maximum current corresponding to the maximum voltage to the current driver does not flow, by the following equation:

$$p_f + a_0 T^2 \quad \text{[Equation 16]}$$

For the four expressions of (Equation 14), (Equation 15), and (Equation 16), there are three parameters $c_1$, $c_2$, and T to be decided, so that the parameters are analytically obtained as follows:

[Equation 17]

(Expression 5)
$$c_1 = \frac{2a_0(p_f - p_0) + v^2 + a_0^2(2p_s - v_s)}{2(p_f - p_0) + 2v_0(v_s - T_w) + a_0(2p_s - T_w^2 + 2T_w v_s - 2v_s^2)}$$

$$c_2 = \frac{(v_0 + a_0(T_w - v_s))^2}{2(p_f - p_0) + 2v_0(v_s - T_w) + a_0(2p_s - T_w^2 + 2T_w w_s - 2v_s^2)}$$

$$T = \frac{2(p_f - p_0) + 2v_0(v_s - T_w) + a_0(2p_s - T_w^2 + 2v_s^2)}{v_0 + a_0(T_w - v_s)}$$

wherein $p_r$ indicates a target position, and $T_w$, $v_s$, and $p_s$ are known values obtained through the functions for jerk. Therefore, $c_1$, $c_2$, and T may be obtained by calculating through the equations above based on a position signal for a head, namely the position $p_0$, velocity $v_0$, and acceleration $a_0$ monitored each time a servo position signal is detected.

Symbol $c_2$ indicates an acceleration required for a head to arrive at a target position within a desired seek time. Therefore, by computing $c_2$ each time a servo position signal is detected, it is possible to determine when switching is to be executed. In other words, as start of deceleration is delayed more, a value of $c_2$ becomes larger, which necessitates an acute deceleration. Therefore it is needed only to switch the trajectory to deceleration when possible deceleration is exceeded. On the contrary, if switching is executed when a value of $c_2$ is not so large, the seek time becomes longer. Therefore, the achievable deceleration may previously be set in a switching determining section.

Figure 3:
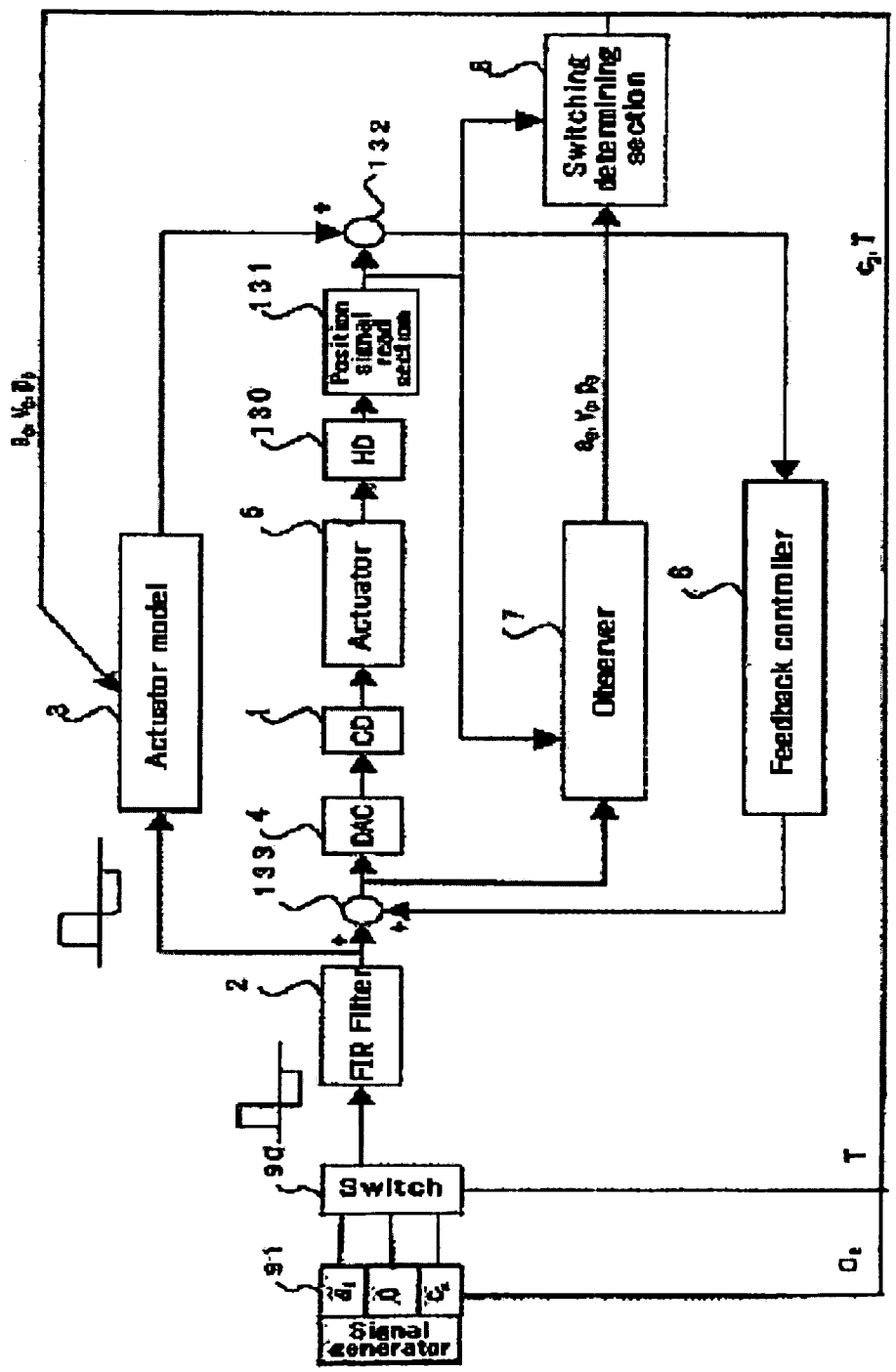
FIG. 3 is a diagram showing another example of the seek control system.

A control system for generating a waveform for seeking in this embodiment is, for instance, as shown in FIG. 3. Of the components each constituting the head seek control unit, a microprocessor 57 comprises an FIR filter 2, an actuator model 3, a signal generator 91, a select switch 90, an adder 133, a subtractor 132, a switching determining section 8, a position read section 131, an observer 7, and a feedback controller 6. The signal generator 91 generates a signal to the FIR filter 2 for acceleration, deceleration, and settling, a select switch 90 for selectively outputting any of acceleration, deceleration, and settling. The adder 133 adds an output from a signal generator 91 via the FIR filter 2 for smoothing a waveform of the generated signal to an output for acceleration from the feedback controller 6. The subtractor 132 computes a difference between an output from the actuator model 3 and a position signal read out by a position signal read section 131 via a head. The feedback controller 6 is a controller for a track follow loop. FIG. 3 shows a current driver 1 adapted to receive a signal from a DAC 4, converts and amplifies the signal, and sends the amplified signal as a drive current to the actuator 5. A head (HD) 130 is driven by the actuator 5, and its position is read as a position signal by the position signal read section 131. This position signal is a servo signal.

In the control system shown in FIG. 3, the observer 7 as a state estimating device monitors a position of the head via the position signal read section 131, and estimates a position $p_0$, velocity $v_0$, and acceleration $a_0$ for a sample each time a position signal is received. Monitoring and estimation by the observer 7 are executed using the known technique as described, for instance, in non-patent document 2 (Tsuneo Yoshikawa & Junichi Imura, Modern Control Theory, Chapter 7: Observer, pp. 119, Shokou-sha (2003)).

Determination as to whether switching is to be carried out or not is performed by the switching determining section 8 through the (Expression 5). For instance, when the $c_2$ computed through (Expression 5) using the estimated acceleration $a_0$, velocity $v_0$, and position $p_0$ becomes larger and the deceleration reaches the preset maximum value for deceleration which may be generated, namely the allowable maximum deceleration, the actual deceleration is switched to a prespecified deceleration, namely to the allowable maximum deceleration based on a required acceleration signal. In short, the switching determining section 8 sets the possible maximum deceleration. This possible maximum deceleration is the allowable maximum deceleration. Further an operation for settling is performed by zeroing an input to the filter in the time computed as T in (Expression 5). This T computed based on a point of time when deceleration is started as a base point of time indicates that, if settling is performed before this point of time T, the head cannot reach the target position, and also that, if settling is started after this point of time, the head goes over the target position. That is to say, this T indicates a point of time when settling is to be started in order for the head to reach a target point computed by the microprocessor 57 from the estimated acceleration, velocity, and position with the shortest period of time.

As described above, the switching determining section 8 computes a point of time when the deceleration estimated from the acceleration, velocity, and position estimated from a monitored position of a head during acceleration indicates the allowable maximum deceleration as a point of time when switching from a prespecified acceleration signal to a prespecified deceleration signal is to be carried out. In addition, the section 8 also computes a point of time when settling is to be started so that the head may reach the target point computed from the estimated acceleration, velocity, and position in the shortest period of time as a point of time for starting settling.

The signal generator 91 generates a prespecified acceleration signal at a first level allowing for generation of the allowable maximum acceleration during acceleration, a prespecified deceleration at a second level allowing for generation of the allowable maximum deceleration during deceleration, and a settling signal set at the zero level during settling. This signal generator 91 inputs the generated signal via a switch 90 into the FIR filter 2. The switch 90 is used for selecting any of acceleration, deceleration, and settling, and generates a signal for an acceleration at the same level as the saturation level of the current driver 1, namely as the same level as that allowing for the maximum current corresponding to the maximum voltage of the current driver 1 to flow. To explain the mechanism with other words, the switch 90 selects $c_2$ for acceleration, namely the allowable maximum deceleration, at the timing for deceleration computed through the (Expression 5). As settling is to be carried out in the time T, the switch 90 generates a zero level signal at the point of time. Basically an input to the FIR filer 2 is used as an input to the actuator model 3. However, when a current is the maximum current corresponding to the maximum voltage of the current driver 1, the actuator 5 actually initializes the acceleration, velocity, and position according to an output from the observer 7.

The switch 90 generates, as an input signal for acceleration, a signal at the same constant level as the maximum level corresponding to the maximum voltage to the current driver 1, namely a prespecified signal for the allowable maximum acceleration. The switch 90 switches the operating mode to deceleration when the deceleration obtained from the estimated acceleration, velocity, and position for reduction of the velocity reaches the prespecified maximum possible level or the allowable maximum deceleration. The switch 90 sets inputs to zeros at the point of time for starting settling. Incidentally, switching from deceleration to settling uses a signal obtained by adding the generated signal to an output from the feedback controller 6 for acceleration with the adder 133.

In this embodiment, when a head is positioned in an HDD, the provision of a head seek control unit makes it possible to allow saturation of a drive current in the current driver 1, namely the current saturation mode in which the maximum current corresponding to the maximum voltage to the current driver 1 flows during acceleration after start of seek, and at the same time to suppress the vibrating mode. As a result, a driving force by the actuator 5 may be utilized to its maximum limit, and also vibrations in settling may be suppressed, so that the time required for seeking may be shortened. Due to the suppression of the vibration mode, vibrations of the actuator 5 may be prevented from propagating to the cover. This provides an advantage that noise in the device caused by vibrations of the cover may be reduced.

The descriptions above assume that there is only one vibration mode of the actuator 5, but even if there are two vibration modes, Tw extends by the time only for 2 samples, and the same technique is applicable. For instance, when a current waveform in which a main resonance with 4.7 kHz is not added to a coil-bending mode with 1.8 kHz is obtained, a remarkable difference is not observed even though smoothness of the waveforms is slightly worsened. However, the transitional response is remarkably improved.

With the configuration as described above, a change in a drive current to an actuator may be smoothed, suppressing high-frequency vibration. As a result, this suppresses the vibration of the cover that would otherwise largely cause acoustic noise through propagation of the high-frequency vibration. Thus, noise reduction may also be achieved.

Figure 9:
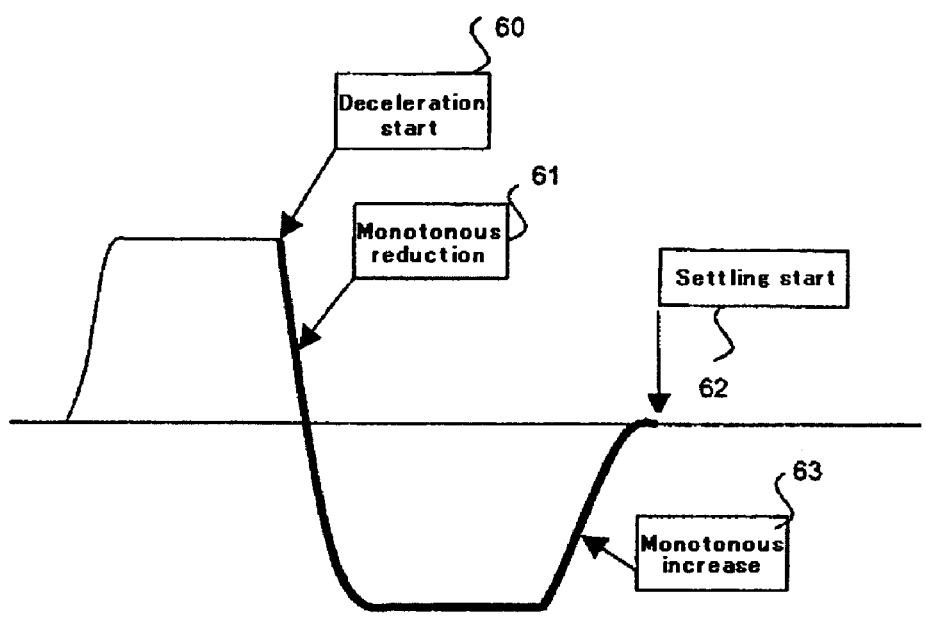
FIG. 9 is a diagram showing an example of a waveform of an input signal into an FIR filter.

In this embodiment, during deceleration and settling in a seek operation of a head, a signal having a waveform, for example, schematically shown in FIG. 9 is smoothed with the FIR filter 2. The smoothed signal is used as a current for driving the actuator 5 through the VCM driving system. The waveform starts from a first level of an acceleration signal allowing for the allowable maximum acceleration in acceleration and reaches a second level of a deceleration allowing for the allowable maximum deceleration in deceleration in the monotonous change mode. Then, the waveform changes from the second level of the deceleration level to a zero level in settling also in the monotonous change mode. Further a result of Laplace transform of an impulse response to the signal is set to be zero in the resonance mode of the actuator 5. With this configuration, an input to the FIR filter 2 is a signal at the same constant level as the saturated level of the current driver 1 in acceleration, namely the level allowing for the maximum current corresponding to the maximum voltage of the current driver 1 to flow.

Deceleration is started at a point of time when the deceleration estimated from the acceleration, velocity, and position estimated by the observer 7 from a monitored position of a head in acceleration reaches the allowable maximum deceleration, and then is switched to the computed allowable maximum deceleration. Further an input to the filter is zeroed in the time computed from the estimated acceleration, velocity, and position to start settling. Then an output from the FIR filter 2 is added to the feedback controller 6, which is a controller for a track follow loop, and an output from the FIR filter 2 is inputted into the actuator model 3. Then the subtractor 132 computes a difference between an output from the actuator model 3 and a position signal outputting a current position data of the head read by the position signal read section 131. The subtractor 132 then inputs the difference to the feedback controller 6 for controlling the head seek of the HDD. The position signal for the head is a servo signal, and this signal is obtained by reading positional information written in a disk with the position signal read section 131 of the head 130.

In this configuration, if the FIR filter 2 for smoothing a signal waveform in deceleration and the FIR filter for smoothing a signal waveform in settling are of the same type, the filter parameters are identical to one another, which ensure further effective operations of the filters.

In other words, a waveform of an input signal into the FIR filter 2 or a waveform of a rectangular input signal generated in deceleration and settling is smoothed by allowing the waveform to pass through the FIR filter 2. As shown in FIG. 9, the waveform starts from a first level of an acceleration signal allowing for the allowable maximum acceleration in acceleration and reaches a second level of a deceleration allowing for the allowable maximum deceleration in deceleration in the monotonous change mode. Then, the waveform changes from the second level of the deceleration level to a zero level in settling also in the monotonous change mode. Incidentally, it is well known that the FIR filter 2 has the transitional characteristics changing from time to time. That is, even if an input signal is switched to a zero level signal upon start of settling, the output is not immediately switched to a zero level.

Figure 10:
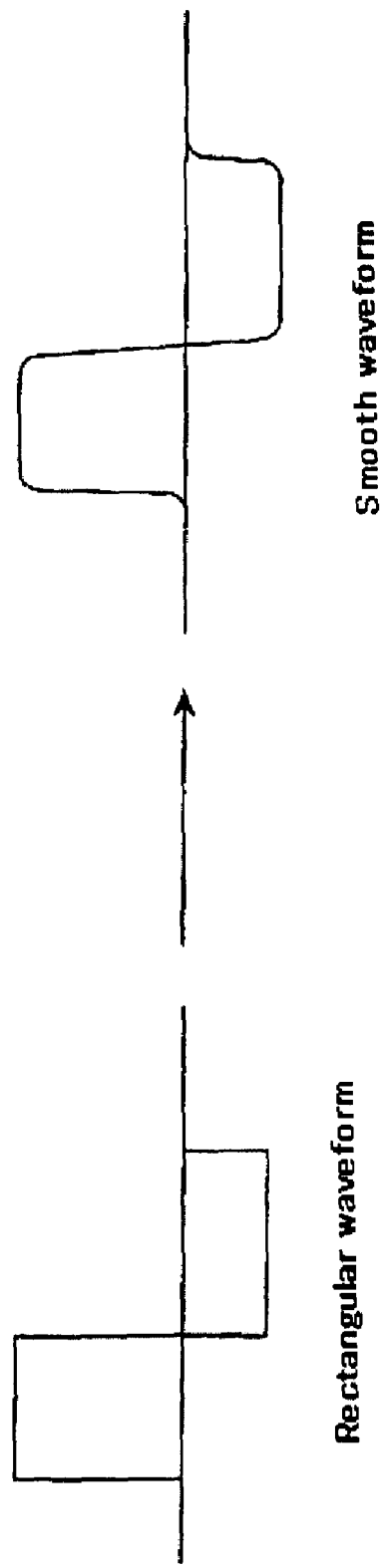
FIG. 10 is a diagram schematically showing an operation for smoothing a rectangular waveform to a smoother waveform with the FIR filter.

An impulse response by this FIR filter 2 is zeroed within a finite period of time, and parameters of the filter are set so that a gain as a result of Laplace transformation becomes zero in the resonance mode of the actuator 5. The filter parameters may be set with the well known technique such as, for instance, that described in non-patent document 3 (Takashi Yahagi, Theory of Digital Signal Processing 2, Filter, Communications, Images, Chapter 2, Designing of FIR Filter, p. 41, Corona Co., (1985)). FIG. 10 schematically shows how a signal having a rectangular waveform is smoothed. By smoothing a signal having a rectangular form, high frequency components are reduced, and as a result, residual vibrations are reduced. The FIR filter 2 may be changed to a filter having other functions by changing the parameters defining the characteristics. Unless the parameters are changed, the characteristics are kept identical, so that the filter may be regarded as the same filter.

An input to the FIR filter 2 in acceleration after start of seeking is a signal at the same constant level as the saturated level of the current driver 1, namely the maximum level corresponding to the maximum voltage of the current driver 1. This signal is a prespecified acceleration signal allowing for the allowable maximum acceleration in acceleration.

Figure 12:
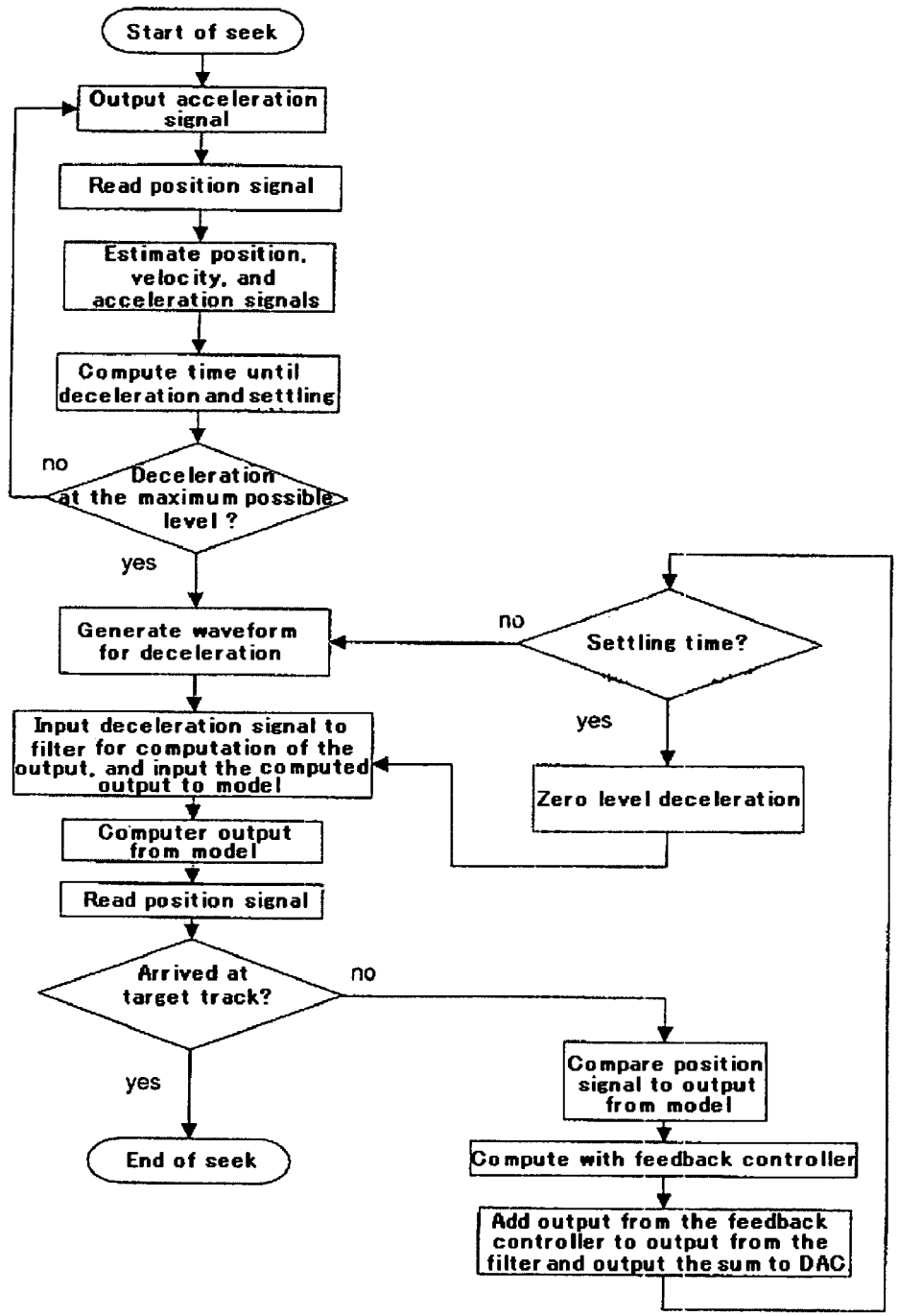
FIG. 12 is a flowchart showing an example of a head seek control flow.

The seek process in this example is carried out according to the sequence shown in FIG. 12. When seeking is started, an acceleration signal is inputted to accelerate the head 130. An input to the filter in acceleration is a signal at the same constant level as the saturated level of the current driver 1, namely the maximum level corresponding to the maximum voltage to the current driver 1. In other words, the input signal is a prespecified acceleration signal allowing for the allowable maximum acceleration. A position signal read via the head 130 by the position signal read section 131 is monitored by the observer 7, and a subsequence position, velocity, and acceleration are estimated from the position signal each sampling time. Based on the estimated position, velocity, and acceleration, the required deceleration and a period of time until settling is to be started are computed by the switching decision section 8. Acceleration is continued until the computed deceleration reaches the preset maximum possible level, namely the allowable maximum level. When the computed deceleration reaches the allowable maximum deceleration, the switching determining section 8 generates a waveform for deceleration, and switches the prespecified acceleration to a prespecified deceleration, namely to a prespecified deceleration signal allowing for the allowable maximum deceleration. The deceleration signal is inputted to the FIR filter 2, and the filter computes the output and inputs the output signal to the actuator model 3. The actuator model 3 computes an output from the model. The switching determining section 8 reads a position signal, and terminates the seeking operation when the head reaches the target track. If the head has not reached the target track, the switching determining section 8 compares the position signal to an output from the model 3, computes an output from the feedback controller 6, and adds the output to an output from the FIR filter 2. This output allows for acceleration. At the point of time for starting settling computed by the switching determining section 8, the deceleration is zeroed and is inputted into the FIR filter 2. If the timing is still ahead, system control returns to the step of generating a waveform for deceleration. This operation sequence is repeated until the head reaches the target track.

This embodiment is especially effective for a long distance seek operation of a head of a rotary recorder/reproducer. The long distance seek operation is defined herein as seek over a distance which is one tenth of the maximum seek distance. For instance, when the number of tracks on a disk, a rotating recording medium, is 40,000, seek over 4000 tracks or more is the long distance seek.

Figure 2:
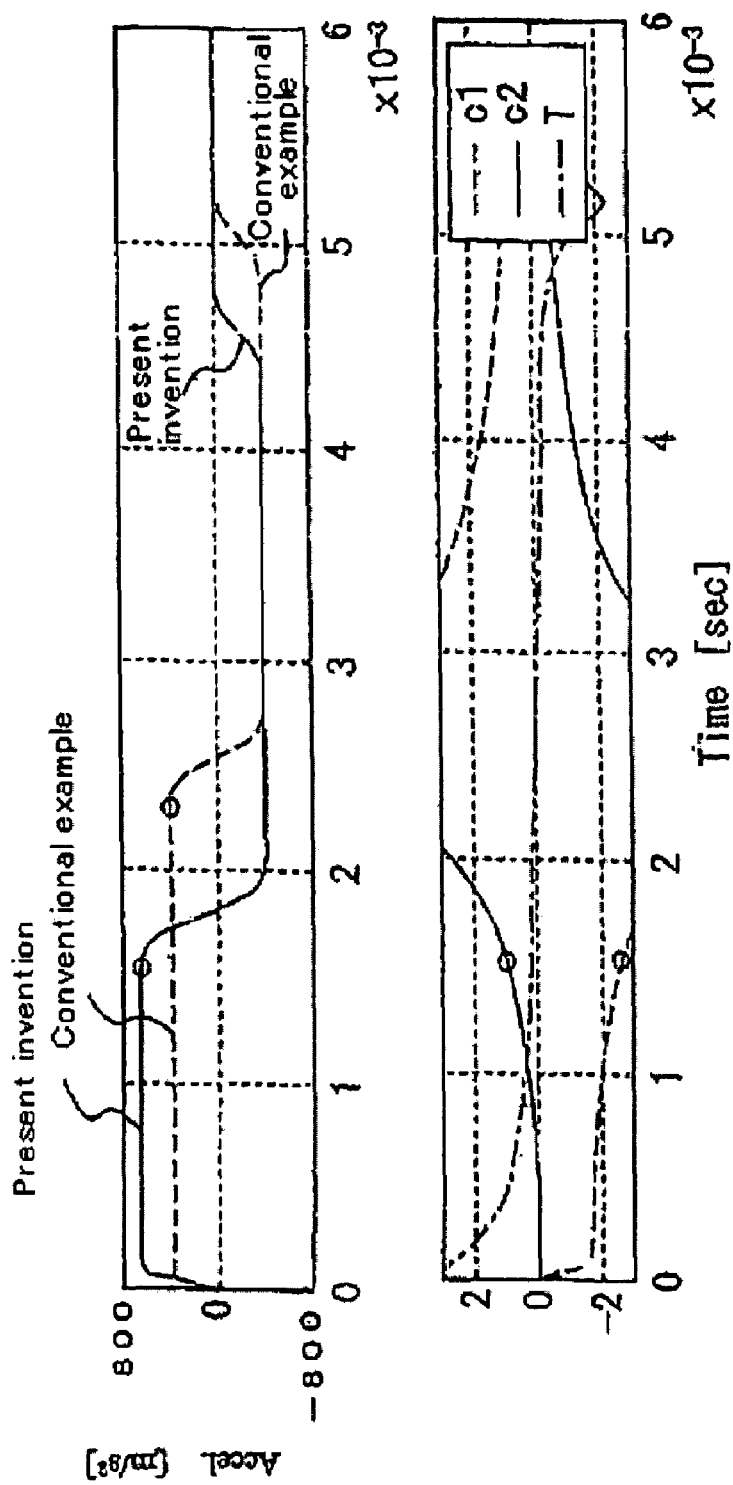
FIG. 2 illustrates an example of the results of a simulation for acceleration.

The results of a simulation in this embodiment are shown in FIG. 2. FIG. 2 shows acceleration and ($c_1$, $c_2$, and T) in this embodiment starting from the above. The upper diagram shows that zero acceleration is reached in the result of this embodiment (solid line) in a shorter period of time as compared to that in the conventional example (broken line). Each circle indicates a point of time when deceleration is started.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A head seek control method comprising:
accelerating a head with an acceleration signal for an allowable maximum acceleration of an actuator;
switching the acceleration signal to a deceleration signal at a point of time when deceleration estimated from the acceleration, velocity, and position estimated from a monitored position of the head reaches an allowable maximum level;
decelerating the head with the deceleration of the actuator; and
switching the deceleration signal to a settling signal at a point of time when the head may reach a target position within the shortest period of time;
inputting an output from the FIR filter to an actuator model;
computing a difference between an output from the actuator model and a position signal read by a position signal read section via the head and inputting the difference into a feedback controller; and
zeroing an input to the FIR filter at a point of time when the settling is started;
wherein the settling signal is used to move the head to a target track;

wherein each of the signals is a signal having a waveform smoothed by a filter;
wherein the filter is a finite impulse response (FIR) filter.

2. The head seek control method according to claim 1, wherein an output for acceleration from the feedback controller is inputted to a digital/analog converter, and an output from the digital/analog converter is inputted to a current driver for inputting a drive current to the actuator.

3. The head seek control method according claim 1, wherein the FIR filter for smoothing a waveform of the deceleration signal and the FIR filter for smoothing a waveform of the settling signal are of the same type.

4. The head seek control method according to claim 1, wherein the acceleration signal is a signal at a level corresponding to the maximum voltage of a current driver for inputting a drive current to the actuator.

5. The head seek control method according to claim 1, wherein a signal generated by the signal generator changes from the acceleration signal to the deceleration signal in monotonous change mode.

6. The head seek control method according to claim 1, wherein a signal generated by a signal generator changes from the deceleration signal to the settling signal in monotonous change mode.

7. A head seek control method comprising:
accelerating a head with an acceleration signal for an allowable maximum acceleration of an actuator;
switching the acceleration signal to a deceleration signal at a point of time when deceleration estimated from the acceleration, velocity, and position estimated from a monitored position of the head reaches an allowable maximum level;
decelerating the head with the deceleration of the actuator; and
switching the deceleration signal to a settling signal at a point of time when the head may reach a target position within the shortest period of time;
wherein the settling signal is used to move the head to a target track;
wherein a signal generated by a signal generator in the deceleration and in the settling is a signal having a rectangular waveform.

8. A rotary recorder/reproducer comprising:
a disk for recording data;
a head for reading and writing the data from and to the disk;
an actuator configured to drive the head in a seek operation for moving the head to a target track on the disk at high-speed, in a following operation for making the head follow the target track, and in a settling operation for transitionally positioning the head between the two types of operation;
a microprocessor configured to generate a control signal for a current drive for the actuator; and
a current driver configured to input an output from the microprocessor to the actuator;

wherein the microprocessor includes:
a signal generator configured to generate an acceleration signal, a deceleration signal, and a settling signal;
a switch configured to selectively output any of the generated signals;
a feedback controller which is a track follow loop for feeding back a position signal read out by the head from the disk;
an adder configured to add an output of any of the generated signals to an output from the feedback controller and outputting the sum as a control signal for a drive current for the actuator;
an observer configured to estimate acceleration, velocity, and position of the head from the position signal read out by the head from the disk; and
a switching determining section configured to switch the switch at a point of time when deceleration estimated from the acceleration, velocity, and position estimated reaches the allowable deceleration level and also at a point of time when settling is to be started so that the head may reach a target position within the shortest period of time.

9. The rotary recorder/reproducer according to claim 8, wherein a filter for smoothing a waveform of any of the signals is provided between the switch and the adder.

10. The rotary recorder/reproducer according to claim 9, wherein the filter is a finite impulse response (FIR) filter.

11. The rotary recorder/reproducer according to claim 10 further comprising:
an actuator model configured to receive an output from the FIR filter; and
a subtractor configured to compute a difference between an output from the actuator model and the position signal and inputting the difference into the feedback controller.

12. The rotary recorder/reproducer according to claim 10, wherein the FIR filter for smoothing the deceleration signal and the FIR filter for smoothing the settling signal are of the same type.

13. The rotary recorder/reproducer according to claim 8, wherein the acceleration signal is a signal at a level corresponding to the maximum voltage of the current driver.

14. The rotary recorder/reproducer according to claim 8 further comprising:
a digital/analog converter configured to receive an output from the adder and output the output to the current driver.

15. The rotary recorder/reproducer according to claim 8, wherein the signal generator generates a signal having such a waveform that the deceleration signal is reached from the acceleration signal, and the settling signal is reached from the deceleration signal, in monotonous change mode.

16. The rotary recorder/reproducer according to claim 8, wherein the signal generator generates the deceleration signal and the settling signal each having a rectangular waveform.

* * * * *

UNITED STATES PATENT AND TRADEMARK OFFICE
CERTIFICATE OF CORRECTION

PATENT NO. : 7,457,076 B2
APPLICATION NO. : 11/335849
DATED : November 25, 2008
INVENTOR(S) : Semba et al.

It is certified that error appears in the above-identified patent and that said Letters Patent is hereby corrected as shown below:

Column 5, line 58, equation 8, please delete
"$v(t)=c_0v_s+c_0(t-T_w)+c_1v_s+c_1(t-T_w-T)+c_2v+c_2(t-T_w-2T)$" and insert
--$v(t)=c_0v_s+c_0(t-T_w)+c_1v_s+c_1(t-T_w-T)+c_2v_s+c_2(t-T_w-2T)$--

Column 5, line 66, expression 1, please delete
"$v_f=v(2T+T_w)=c_0v_s+c_0(2T)+c_1v_s++c_1T+c_2v_s=(c_0+c_1+c_2)v_s+(2c_0+c_1)T=0$" and insert
--$v_f=v(2T+T_w)=c_0v_s+c_0(2T)+c_1v_s+c_1T+c_2v_s=(c_0+c_1+c_2)v_s+(2c_0+c_1)T=0$--

Column 6, line 38, equation 13, please delete
"$p_f c_0 T^2$" and insert
--$p_f=c_0T^2$--

Signed and Sealed this

Twenty-fourth Day of February, 2009

JOHN DOLL
*Acting Director of the United States Patent and Trademark Office*